United States Patent

Heath

[15] 3,636,519

[45] Jan. 18, 1972

[54] INFORMATION PROCESSING APPARATUS

[72] Inventor: Frederick George Heath, 90 Northcote Road, Bramhall, Cheshire, England

[22] Filed: Jan. 6, 1970

[21] Appl. No.: 984

[30] Foreign Application Priority Data

Jan. 8, 1969 Great Britain ........................1,082/69

[52] U.S. Cl. ..........................................................340/172.5
[51] Int. Cl. ..........................................................G06f 7/06
[58] Field of Search ................................................340/172.5

[56] References Cited

UNITED STATES PATENTS

| | | | |
|---|---|---|---|
| 2,798,216 | 7/1957 | Goldberg et al. | 340/172.5 X |
| 2,907,003 | 9/1959 | Hobbs | 340/172.5 X |
| 3,201,758 | 8/1965 | Pouliart et al. | 340/172.5 |
| 3,329,939 | 7/1967 | Armstrong | 340/172.5 |
| 3,350,694 | 10/1967 | Kusnick et al. | 340/172.5 |
| 3,427,596 | 2/1969 | Hertz | 340/172.5 |
| 3,533,074 | 10/1970 | Webb | 340/172.5 |

*Primary Examiner*—Raulfe B. Zache
*Assistant Examiner*—Sydney R. Chirlin
*Attorney*—Hane & Baxley

[57] ABSTRACT

Apparatus is shown for maintaining a group of items of data, each held in a separate section of a store in a predetermined order, e.g. to form a queue of the items by reference to priority designations respectively contained within the items, under conditions, for example, where items may be removed from the group and replaced by others. The items are repeatedly circulated respectively each through a separate short register which is capable of containing the designation. Comparators are connected between those short registers adjacent one another in order of the priority queue. On each circulation alternate ones of the comparators are rendered effective to cause adjacent pairs of the items to be ordered on reentry into the store sections according to their mutual priority designations, the comparators rendered effective on successive circulations being alternately interlaced so that the entire group is brought into designation order. Provision is made for removal of items from, and entry of new items into, the store.

10 Claims, 1 Drawing Figure

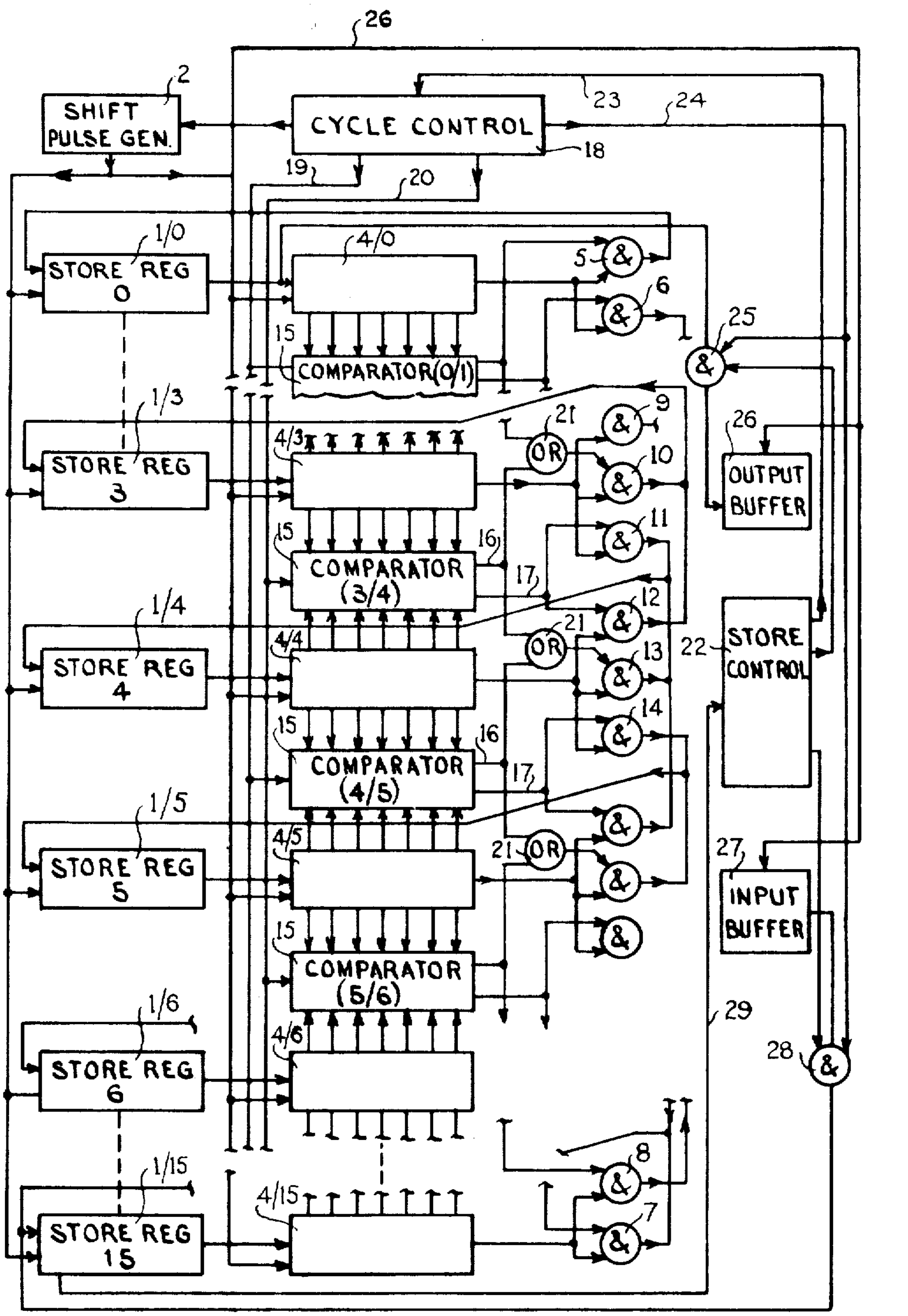
INVENTOR
FREDERICK GEORGE HEATH
BY Hane and Baxley
ATTORNEYS

INFORMATION PROCESSING APPARATUS

BACKGROUND OF THE INVENTION

1. Field of the Invention

The present invention relates to information processing apparatus, and in particular to apparatus for sorting or rearranging items of information.

2. Description of the Prior Art

Various techniques are known for sorting items of information by the use of a computer. The normal sorting operation consists in repeatedly rearranging the items until they are in a sequence determined by the significance of a sort factor in each item. Thus, the items may be arranged in alphabetical order by reference to a name in each item, or in numerical order by reference to a number in each item. Once the desired sequence has been achieved, the sorting operation is finished.

There is a requirement for a modified form of sorting which will be referred to as queue sorting, in which the sequence of group of items is maintained despite changes in the items. These changes may result from additions to, and deletions from, the items comprising the group, and/or from changing the sort factor of some of the items of the group.

A provision for queue sorting is desirable, for example, in the program control of computers. In general, the rate of transfer of information between the central processor and peripheral devices is substantially less than the operating speed of the central processor. The efficiency of the system is increased if peripheral transfers and processing can occur concurrently. A queue of peripheral transfers may arise and it is desirable to keep these arranged in a sequence of priority. For example, transfers to and from a magnetic tape unit may have a higher priority than transfers to a printer.

A comparable situation may arise in a system which is capable of dealing with several independent programs. The computer operates under the control of one program until an instruction, such as a transfer of input information, cannot be executed immediately. Control is then transferred to another of the programs according to a priority system. The relative priorities of the programs may be changed during operation, so that the list of program priorities has to be reordered.

SUMMARY

According to the invention, information processing apparatus includes an information store having a plurality of storage sections, each section arranged to store an information word, the word including a part having sequence determining significance, the storage sections being arranged in order of significance from lowest to highest; means for entering an input word into the section of lowest significance; means for reading an output word from the section of highest significance; a plurality of comparing means; recirculating means arranged to withdraw and reenter words stored in the sections in each of a succession of comparing cycles, the recirculating means including means for applying concurrently to each of the comparing means during a single comparing cycle at least those sequence determining parts of a pair of words respectively from storage sections adjacent in said order, the comparing means being responsive to said sequence determining parts to produce a signal indicative of the relative magnitudes of said sequence determining parts of said pair of words, said recirculating means being responsive to said signal to modify the reentry of the pair of words into the storage sections according to the relative significances of the sections in the order and magnitudes of said sequence determining parts.

BRIEF DESCRIPTION OF THE DRAWING

The drawing shows, in block schematic form, the arrangement of apparatus embodying the invention.

DESCRIPTION OF PREFERRED EMBODIMENT

Referring now to the drawing, apparatus embodying the invention, which will be described by way of example includes an information store, in which information words may be stored. Each word is stored in a separate section or register 1. Thus, there are a number of registers 1 and for the purposes of the present description it will be assumed that 16 registers 1 are provided. Each information word may consist, for example, of binary digits, or bits, which are in turn arranged in different groupings. For example, the word may include one bit signifying that an effective information item is contained in the word and will be termed the "message present" bit. Other bits, say 15 of them, may contain the actual item or message, while the remaining bits may signify, for example, the name or title of the item for identification purposes and a group of, say, seven bits which signify the priority of the item. Hence, a word may consist of, say, 27 bits of which seven are used to indicate the priority of the word relative to the other words stored.

Each register 1 may be a conventional form of shift register using, for example, TTL logic elements. If the highest speed of operation is required, the register may use LSI techniques. For convenience in description, the registers 1 will be referred to as register 1/0, register 1/1... register 1/15, the register 1/0 being the highest in the sequence.

Shift pulses from a shift pulse source 2 are applied simultaneously to all the registers, so that a bit is read out of all the registers simultaneously and the bits of a word in a register are read out serially. The bits read out from each register respectively are fed to the input of a seven-bit shift register 4, which receives the same shift pulses from the source 2 as the main storage registers 1. A separate seven-bit register 4 is provided in association with each of the main storage registers 1, and the registers 4 are referenced in the drawing with a suffix to indicate this association. For clarity, only the registers 4/0; 4/3; 4/4; 4/5; 4/6 and 4/15 are shown in the drawing.

A group of AND gates is associated with the output end of each of the seven-bit registers 4. In the case of the register 4/0, associated with the store register 1/0 of highest significance, the group consists of two AND-gates 5 and 6 respectively. In the case of the register 4/15, associated with he store register 1/15 of lowest significance, the group also consists of two AND-gates 7 and 8 respectively. In the case of the intervening registers 4/1 through 4/14 three AND gates are associated with each register, and for the sake of clarity the AND-gates 9, 10 and 11 respectively associated with register 4/3 and the AND-gates 12, 13 and 14 respectively associated with register 4/4 will be described in detail. The output path from each register 4 is connected to those AND gates which are associated with the register and the AND gates are controlled by comparators 15. A separate comparator 15 is provided between each adjacent pair of registers 4. Thus, one comparator 15 is interposed between registers 4/0 and 4/1. A second comparator 15 is interposed between registers 4/1 and 4/2, a third between registers 4/2 and 4/3 and so on. Each comparator 15 compares the contents of the two registers between which it is interposed to determine whether or not the word in the lower ordered register 1 is more significant than that in the higher ordered register 1. Two outputs 16 and 17 are provided from each comparator 15. The output 16 carries a signal if the lower ordered register contains the less significant word, and this signal is applied to open one of the AND gates, for example the gates 5, 7, 10 and 13 as shown. The output 17 carries a signal if the lower ordered register contains a more significant word, and this signal is applied to open another one of the AND gates, for example, the gates 6, 8, 11 and 12 as shown.

The outputs from these AND gates are connected to the inputs of the store registers 1, and the connections of the gates to these inputs is such that as the result of the comparison the contents of a pair of adjacent registers 1 are interchanged if the comparator 15 concerned produces an output signal on the line 17. For example, the comparator 15 for the pair of registers 4/3 and 4/4 will open the AND-gates 11 and 12 respectively associated with the registers to transfer the word from register 1/3 into register 1/4, and that from register 1/4 into register 1/3, if the comparison result is that the priority of the word in register 1/3 is less than that of the word in register 1/4.

If the comparator result is that the priority of the word in register 1/3 is not less than that of the word in register 1/4, the comparator 15 output on line 16 opens the AND-gates 10 and 13 for the registers 4/3 and 4/4 respectively to allow each word to be read back into that register 1 from which it was read out. Thus, at each comparison, one, or more, of the words may be shifted by one position up the sequence of main storage registers 1, the displaced word, or words, being shifted down one position. It will be realized that to arrange for the simultaneous comparison of all adjacent pairs of words would involve a very complex logic arrangement, because, for example, each register 4 is involved in two comparisons, one with the register of next higher significance and one with that of next lower significance. It is accordingly preferred to separate the comparisons into two nonoverlapping groups which take place in successive comparison cycles. To this end a cycle control unit 18 is provided. The unit 18 controls the emission, in each cycle, of the requisite number of shift pulses from the shift pulse generator 2 to cause the words to be read out of the storage section registers 1, through the associated registers 4, the AND gates associated therewith and back again into the registers 1. The comparators 15 are also controlled over a pair of lines 19 and 20 respectively so that on one cycle the comparators 15 associated with the registers 4/0 and 4/1; 4/2 and 4/3; 4/4 and 4/5; and so on, are rendered effective, while on alternate cycles those comparators 15 associated with registers 4/1 and 4/2; 4/3 and 4/4; 4/5 and 4/6 etc., are rendered effective. The alternation of these cycles continues to allow the complete ordering of the words in the registers 1.

The cycle control unit 18 also ensures that the comparators selected for each cycle are rendered effective only at the time when the seven priority bits have been shifted from the registers 1 and are contained in the registers 4 so that the reordering of the words is dependent only on these bits.

It will also be apparent that the AND gates associated with noninterchange of a pair of words, for example the AND-gates 10 and 13, may be operated by each of the two comparators 15 that are associated with the same register 4. To permit this operation to take place OR gates, such as the OR-gates 21, are provided in the control lines of the AND gates concerned from the comparators 15.

It will be appreciated that on the result of successive cycles of comparison a word may be moved from the lowest to the highest storage register 1 in a time equal to 16 times the duration of a comparison cycle. The information word having the highest priority is required to be read out of the store register 1/0. In order to perform this operation a store control unit 22 is provided. The unit 22 normally forms a part of the control circuitry for the central processing unit of an electronic computer, or example. Thus, if a word is required to be read from storage, the store control unit 1 is activated. The unit 22 applies an inhibiting signal over a line 23 to arrest the comparison cycles. An interlock signal line 24 is also provided so that the store control can break into the cycle control unit 18 only at times when one comparison cycle has been completed and the next has not yet begun. Once the store control unit has established the inhibition of comparison it opens an AND-gate 25 to connect the output of register 1/0 to an output buffer store 26, which is also conditioned by the store control unit 22 to receive an incoming word. A line 26 connects the shift pulse generator 2 to the output buffer 26 so that it operates in synchronism with the bit readout from the register 1/0. The generator 2 is controlled by the cycle control unit 18 to emit a train of shift pulses to move the word from register 1/0 into the output buffer 26. It is also to be preferred that an additional AND gate should be provided in the shift pulse supply line so that only the register 1/0 has shift pulses applied to it at this time, although since the contents of the register 1/0 are read directly into the output buffer, the occurrence of a comparison cycle concurrently with this unloading operation is, for many purposes, immaterial.

Under normal conditions, however, the recirculation of the word readout is to be avoided, so that after reading out the bits registered in register 1/0 are all made zero. This allows the subsequent comparison cycles to shift the all-zero word down to the least significant register 1/15, and to bring the remaining word of highest significance up into the register 1/0 in readiness for a further reading operation. Under certain conditions it is preferred that the word readout is preserved with the "message present" bit only changed to zero. It will be appreciated that this may be accomplished by suitable gating on the recirculating path or by forcible resetting of the appropriate stage of the register 1/0.

The entry of a new word into the least significant store register 1/15 is also accomplished under control of the store control unit 22. In this case the interlocks controlling the inhibition of the comparison cycles function as described above, but a separate input buffer 27 is provided connected by its output through an AND-gate 28 to the word recirculation loop at the input of register 1/15. As before the input buffer is conditioned by the shift pulse line from the generator 2 and the AND-gate 28 is opened by the store and cycle control units 22 and 18 respectively to permit the word to be entered to be shifted from the input buffer 27 to the register 1/15. In this case, too, the shift pulses applied to the register 1/15 may be inhibited from affecting the other registers 1 by the inclusion of an AND gate in the shift pulse supply line to these registers. A further interlock is also provided is association with the operation of reading-in. A signal is derived from that stage of the register 1/15 that contains the "message present" bit if this bit signifies that an effective word is contained in the register, and the derived signal is applied over a line 29 to the store control unit 22. The presence of the signal indicates that the register of lowest significance contains an effective word and that, by implication, the store is full and cannot accept a new word. Hence, the signal on the line 29 inhibits the interruption of the comparison cycles for the entry of a new word. It will be realized that in this case the inhibition of the entry of a new word is maintained until after the word of highest significance has been read out and there have been a sufficient number of subsequent comparison cycles to shift all the remaining words into registers 1 of higher significance to leave that of lowest significance empty.

It is also to be understood that variations in the operation of the apparatus are possible. For example, the transfer of an information word from the register 1/0 to the output buffer 26 may alternatively be made by directly transferring the bits of the word in parallel to the output buffer 26. Similarly, the entry of a word from the input buffer 27 to the register 1/15 may be effected in parallel. The group of store registers 1 will usually operate autonomously, without reference to the timing of operations within the computer with which it is used, and the comparison cycles may be made continuously under control of the cycle control unit 26 and the pulse generator 2. While the interlock for controlling the entry of a new word into register 1/15 has been described as allowing a word to be transferred from the input buffer only if the message present bit in register 15 is zero, other ways may be used to provide this facility. For example, when an all-zero word is shifted down into the register 1/15, it is monitored and an input transfer is allowed only if the bits of the register 1/15 word are all zeros.

Alternatively, where, as described above, the message present bit is set to zero, whether or not the word bits are also zero, it may be arranged that this overrides the value of the priority bits by, for example, providing an additional comparison stage in the comparators 15 that treats the message present bit as having greatest priority significance.

It will be appreciated that the number of main storage registers 1 and the layout of the information word, in the foregoing description are merely by way of example. In particular, the priority bits do not have to indicate priority in the restricted sense, they may represent any information which allows the words to be arranged in a meaningful order. For example, if the priority bits represented customer account number, the words would be sorted in order of account number. Furthermore, interchanging the connections of the comparators 15 to their associated AND gates would allow the order to be reversed, that is, register 1/0 would then contain the word with the lowest priority, or value. Moreover, the reading out and entry of words may both take place at the same end of the sequence of registers 1.

It has been explained that the splitting of the overall comparison into two alternately performed cycles simplifies the circuits which are necessary. It also allows a reduction in he number of comparators 15, at the expense of an increase in the number of AND gates. For example, in an alternative example, only eight comparators 15 may be provided, additional AND gates being provided for the inputs and outputs of the comparators 15 to provide the necessary alteration of connections as between the two comparison cycles. For example, the first comparator 15 might then be connected to register 1/1 on both cycles, and to register 1/0 on the first cycle and to register 1/2 on the second cycle. Similarly, the outputs of this comparator would then control AND gates for registers 1/0 and 1/1 on the first cycle and registers 1/1 and 1/2 on the second cycle.

It will be appreciated that the foregoing description describes the functions of a number of logic elements, without describing the actual circuitry of these elements. However, the particular forms of circuitry used will clearly depend upon the particular forms of element to be used, and the various components, shift registers, comparators, and gates, logic signal generators, are all well known per se, and it is to be understood that an appropriate selection from among the known elements may be made without difficulty by one skilled in the art to ensure that all the elements are mutually compatible.

I claim:

1. Information processing apparatus, including an information store having a plurality of storage sections each arranged to store an information word, a stored word including a part specifying significance in a sequence, the storage sections being arranged in a sequential order of significance from lowest to highest; a corresponding plurality of word recirculation means, each different word recirculating means being individually associated respectively with each different one of the storage sections and being arranged to receive a word from its associated storage section during a word comparing cycle; and a number of comparing means, each respectively being connected to a pair of recirculating means associated respectively with adjacent storage sections in he sequential order, each recirculating means including means for applying to the comparing means connected thereto, during the word comparing cycle said significance specifying part of a word, the comparing means being responsive to those applied parts of the pair of words from the connected recirculating means to produce a signal indicative of the relative significance of the pair of words in the sequence, each recirculating means of said pair further including reentry means responsive to said signal from the comparing means to control the reentry of the received word into the associated pair of storage sections in accordance with the sequential order in which the sections are arranged and with the relative significances of the pair of received words so that that received word of the pair containing a part specifying the higher significance is reentered into the storage section occupying a position in the arrangement of higher sequential significance.

2. Apparatus as claimed in claim 1 in which each storage section has an input and an output and the recirculating means includes a path for each section joining the output to the input, and means for shifting a word from the section over said path, the path including gating means, the gating means being arranged selectively to connect the path from the output of one storage section to the section inputs of the same and adjacent significances in the order respectively, the gating means being selectively operable by said signal from said comparing means.

3. Apparatus as claimed in claim 2 in which said recirculating means includes for each path a register, the register being arranged to receive directly from the corresponding storage section at least said sequence determining part of a word shifted out of said corresponding section, and in which said comparing means includes a comparator connected between each pair of registers associated respectively with storage sections of adjacent significances in the order.

4. Apparatus as claimed in claim 3 in which said comparator is effective to produce a first signal if the sequence determining part of the word from the higher significance storage section equals or exceeds that of the word from the lower significance storage section and a second signal if the sequence determining part of the word from the lower significance storage section exceeds that of the word from the higher significance storage section, and in which the gating means includes for each of the pair of registers AND gates operable in response to said first and second signals to connect the words read from the outputs of the pair of storage sections to the inputs of the same sections respectively if said first signal is produced and to interchange the connections between the outputs and inputs of the sections of the pair if said second signal is produced.

5. Apparatus as claimed in claim 4 including means for controlling the succession of comparing cycles, the control means being connected to said comparators selectively to render effective different ones of said comparators on successive comparing cycles, those comparators connected with the same registers respectively being rendered effective on different comparing cycles.

6. Apparatus as claimed in claim 5 in which the comparators are arranged in two interleaved groups, one group including those comparators connected between the registers associated with alternate ones of the storage sections and those associated with sections of next higher significance and the second group including the remaining comparators, and in which the groups are alternately rendered effective.

7. Apparatus as claimed in claim 2 including means for extracting a word from that storage section at one end of the order.

8. Apparatus as claimed in claim 7 in which the extracting means includes means for transferring the word from the storage section to an output register and means for inhibiting said succession of comparing cycles during the period of transfer.

9. Apparatus as claimed in claim 2 including means for entering a word into that storage section at one end of the order.

10. Apparatus as claimed in claim 9 in which said entering means includes means for transferring the word from an input register to said storage section; means for inhibiting said succession of comparing cycles during the period of transfer and means for inhibiting the transfer if a word is contained in each of said storage sections.

* * * * *